US012521290B2

(12) United States Patent
Yeckel

(10) Patent No.: US 12,521,290 B2
(45) Date of Patent: *Jan. 13, 2026

(54) PERSON LIFTING APPARATUSES INCLUDING LIFTING STRAPS AND METHODS OF OPERATION

(71) Applicant: Liko Research & Development AB, Lulea (SE)

(72) Inventor: Christopher Yeckel, Batesville, IN (US)

(73) Assignee: LIKO Research & Development AB, Luleå (SE)

( * ) Notice: Subject to any disclaimer, the term of this patent is extended or adjusted under 35 U.S.C. 154(b) by 953 days.

This patent is subject to a terminal disclaimer.

(21) Appl. No.: 17/518,073

(22) Filed: Nov. 3, 2021

(65) Prior Publication Data

US 2022/0054339 A1 Feb. 24, 2022

Related U.S. Application Data

(63) Continuation of application No. 16/245,440, filed on Jan. 11, 2019, now Pat. No. 11,191,688.

(60) Provisional application No. 62/616,169, filed on Jan. 11, 2018.

(51) Int. Cl.
*A61G 7/10* (2006.01)

(52) U.S. Cl.
CPC ......... *A61G 7/1015* (2013.01); *A61G 7/1051* (2013.01); *A61G 2203/10* (2013.01); *A61G 2203/32* (2013.01)

(58) Field of Classification Search
CPC .. A61G 7/1015; A61G 7/1042; A61G 7/1051; A61G 7/1061; A61G 7/1065; A61G 2203/10; A61G 2203/32; B66D 1/26
USPC .......................................................... 5/88.1
See application file for complete search history.

(56) References Cited

U.S. PATENT DOCUMENTS

| | | | | |
|---|---|---|---|---|
| 5,499,408 A * | 3/1996 | Nix | A61G 7/1061 | 5/85.1 |
| 5,809,591 A | 9/1998 | Capaldi | | |
| 6,006,377 A * | 12/1999 | Asakawa | A61G 7/1042 | 5/81.1 R |

(Continued)

FOREIGN PATENT DOCUMENTS

| | | | | |
|---|---|---|---|---|
| EP | 2671557 A1 * | 12/2013 | A61G 7/1015 |
| WO | 2011097698 A1 | 8/2011 | |

OTHER PUBLICATIONS

European Search Report relating to European Application No. 19151283.9 dated May 23, 2019.

(Continued)

*Primary Examiner* — David R Hare
(74) *Attorney, Agent, or Firm* — Dinsmore & Shohl LLP

(57) ABSTRACT

A person lifting apparatus includes a strap movement system. The person lifting device includes a housing and a lifting strap feeding device located in the housing. The lifting strap feeding device includes a motor connected to a drum and a lifting strap wound on the drum. A sensor provides a signal indicative of force on the lifting strap. A controller receives the signal from the sensor. The controller controls operation of the motor based on the signal. A user input is used to place the strap movement system in a fast mode during which the controller speeds up operation of the motor from a normal operating speed.

20 Claims, 12 Drawing Sheets

(56) References Cited

U.S. PATENT DOCUMENTS

| | | | | |
|---|---|---|---|---|
| 6,523,195 | B1 | 2/2003 | Rodier et al. | |
| 7,062,804 | B2 * | 6/2006 | Rouse | A61G 7/1051 5/88.1 |
| 7,240,621 | B2 | 7/2007 | Chepurny et al. | |
| 7,634,824 | B2 * | 12/2009 | Gramkow | B60B 33/0042 5/81.1 R |
| 8,910,325 | B2 | 12/2014 | Faucher et al. | |
| 10,182,955 | B2 * | 1/2019 | Brulotte | A61G 7/1042 |
| 11,103,400 | B2 * | 8/2021 | Brulotte | A61G 7/1073 |
| 11,191,688 | B2 * | 12/2021 | Yeckel | A61G 7/1051 |
| 2010/0224841 | A1 | 9/2010 | Liljedahl | |
| 2011/0239367 | A1 * | 10/2011 | Gramkow | A61G 7/1015 5/81.1 R |
| 2013/0019401 | A1 * | 1/2013 | Faucher | A61G 7/1042 5/85.1 |
| 2014/0013503 | A1 | 1/2014 | Dixon et al. | |
| 2014/0115778 | A1 | 5/2014 | Ng | |
| 2014/0223660 | A1 * | 8/2014 | Bolin | A61G 7/10 5/83.1 |
| 2015/0107020 | A1 | 4/2015 | Andersson et al. | |
| 2017/0027794 | A1 | 2/2017 | Andersson et al. | |
| 2017/0354559 | A1 | 12/2017 | Brulotte et al. | |

OTHER PUBLICATIONS

European Office Action relating to European Application No. 19151283.9 dated Feb. 17, 2021.

* cited by examiner

PERSON LIFTING APPARATUSES INCLUDING LIFTING STRAPS AND METHODS OF OPERATION

CROSS-REFERENCE

This application is a continuation of U.S. patent application Ser. No. 16/245,440 filed Jan. 11, 2019 and entitled "Person Lifting Apparatuses Including Lifting Straps and Methods of Operation" which claims the benefit of priority to U.S. Provisional Application No. 62/616,169 filed Jan. 11, 2018 and entitled "Person Lifting Apparatuses Including Lifting Straps and Methods of Operation", each of which are incorporated herein by reference herein.

FIELD

The present specification generally relates to person lifting apparatuses and, in particular, person lifting apparatuses that include lifting straps, and methods for operating the same.

TECHNICAL BACKGROUND

Person lifting systems, such as overhead lifts are often used to transport patients for any number of reasons. For example, overhead lifts may operate like a winch and include a lift motor and a lift drum that is driven by the lift motor. A lift strap may be coupled to the lift drum for lifting and lowering a patient when the drum is rotated and the lift strap is either wound up onto the lift drum or paid out from the lift drum. A sling bar device may be connected to an end of the lift strap. The sling bar device may include a load hook that connects to a patient lift sling.

Typical person lifting systems employ only a single lift strap operably connected to the lift drum. However, there may be instances where multiple lift straps may be desired. What is needed is a person lifting apparatus that includes multiple lifting straps.

SUMMARY

According to one embodiment, a person lifting apparatus includes a housing and a first lifting strap feeding device located in the housing. The first lifting strap feeding device includes a first drum and a first lifting strap wound on the first drum. A second lifting strap feeding device is located in the housing. The second lifting strap feeding device includes a second drum and a second lifting strap wound on the second drum. The first lifting strap feeding device is support by a support structure such that the first lifting strap is directed both horizontally and vertically in the housing toward an exit opening in the housing that is offset horizontally from the first drum.

In another embodiment, a person lifting apparatus includes a housing and a first lifting strap feeding device located in the housing. The first lifting strap feeding device includes a first drum and a first lifting strap wound on the first drum. A second lifting strap feeding device is located in the housing. The second lifting strap feeding device includes a second drum and a second lifting strap wound on the second drum. The first lifting strap feeding device is support by a support structure such that a strap feed out location of the first lifting strap feeding device faces outward at an angle to both horizontal and vertical.

In another embodiment, a method of operating a person lifting apparatus is provided. The method includes supporting a first lifting strap feeding device in a housing. The first strap feeding device includes a first drum and a first lifting strap wound on the first drum. A second lifting strap feeding device is supported in the housing. The second strap feeding device includes a second drum and a second lifting strap wound on the second drum. The first lifting strap extends both horizontally and vertically in the housing toward an exit opening in the housing that is offset horizontally from the first drum.

In yet another embodiment, a person lifting apparatus includes a strap movement system including a housing and a lifting strap feeding device located in the housing. The lifting strap feeding device includes a motor connected to a drum and a lifting strap wound on the drum. A sensor provides a signal indicative of force on the lifting strap. A controller receives the signal from the sensor. The controller controls operation of the motor based on the signal. The controller includes logic that speeds up operation of the motor if the force on the lifting strap is above a first predetermined threshold value and below a second predetermined threshold value.

Additional features of the person lifting apparatuses and methods for operating the person lifting apparatuses described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
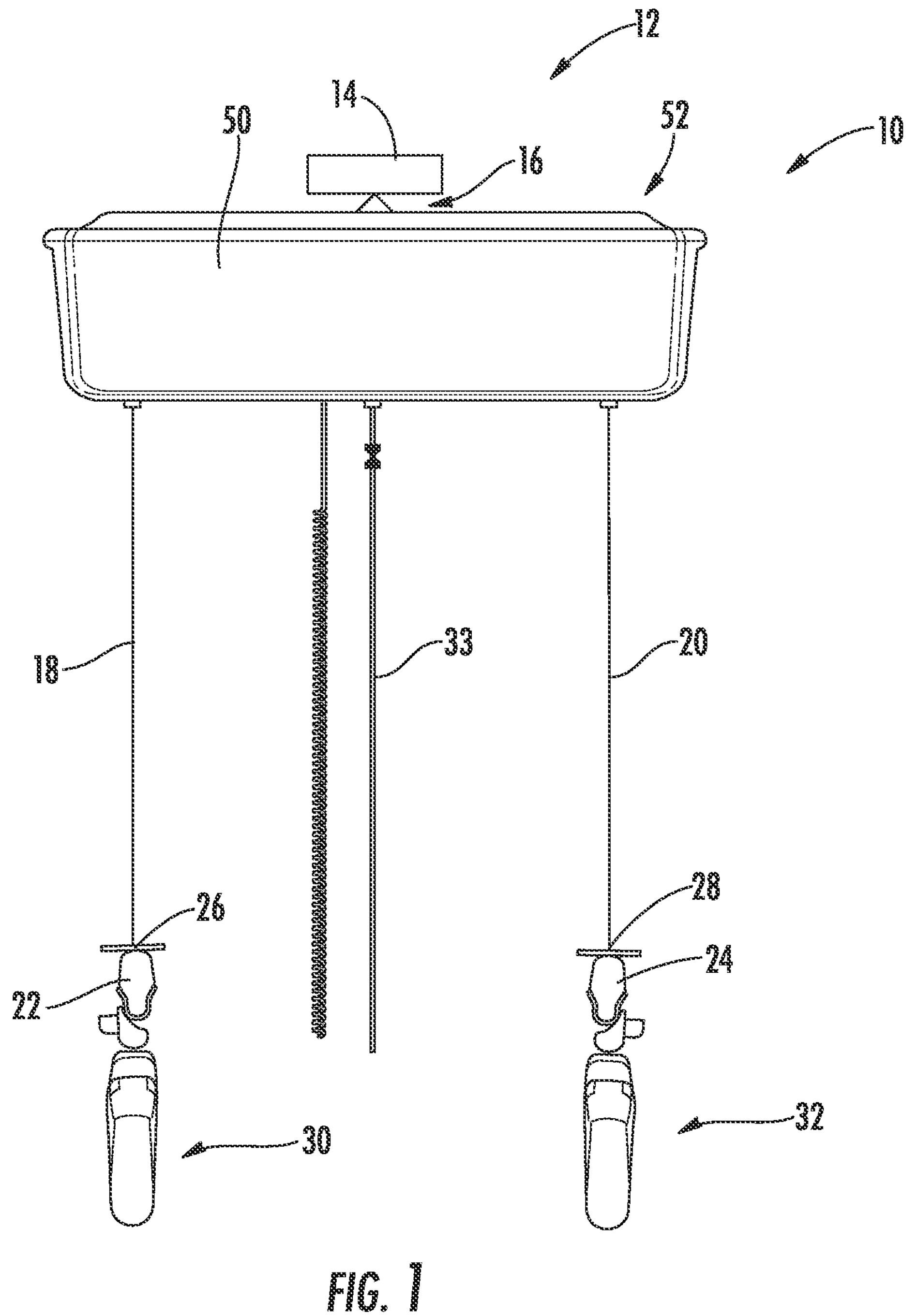
FIG. 1 is a front view of an overhead person lifting apparatus, according to one or more embodiments shown and described herein.

Reference will now be made in detail to embodiments of person lifting apparatuses and methods of operating the same, examples of which are illustrated in the accompanying drawings. Whenever possible, the same reference numerals will be used throughout the drawings to refer to the same or like parts. One embodiment of a person lifting apparatus is schematically depicted in FIG. 1, and is designated by the reference numeral 10. The person lifting apparatus may generally include two lift actuators operatively connected to accessory couplings via two lift straps, whereby each lift actuator raises and lowers the respective accessory coupling using the respective lift strap. The accessory couplings connect to a device, such as a sling bar device, which, in turn, can connect to a patient lift sling. Various embodiments of person lifting apparatuses and methods for operating the same will be described herein with specific reference to the appended drawings.

Referring to FIG. 1, the person lifting apparatus 10 is part of an overhead patient lifting system 12 that includes one or more rails 14 that are secured or coupled to a support surface, such as a ceiling of a room. The person lifting apparatus 10 is movably coupled to the rail 14 by a carriage 16. In this embodiment, the person lifting apparatus 10 is configured to support and lift a patient with a pair of lifting straps 18 and 20. The lifting straps 18 and 20 may each include an accessory coupling 22 and 24 located at a free end 26 and 28 of the lifting straps 18 and 20. Sling bar devices 30 and 32 are illustrated connected to the accessory couplings 22 and 24. While sling bar devices 30 and 32 are illustrated other accessories may be coupled to the lifting straps 18 and 20 depending on the desired lifting or other support operation. In some embodiments, a sling or harness may be coupled to both of the sling bar devices 30 and 32 to support a person for a person lifting and/or tilting operation. An emergency brake strap 33 may be provided that can be utilized to stop all operation of the person lifting apparatus 10 and hold the lifting straps 18 and 20 in their current positions.

Figure 2:
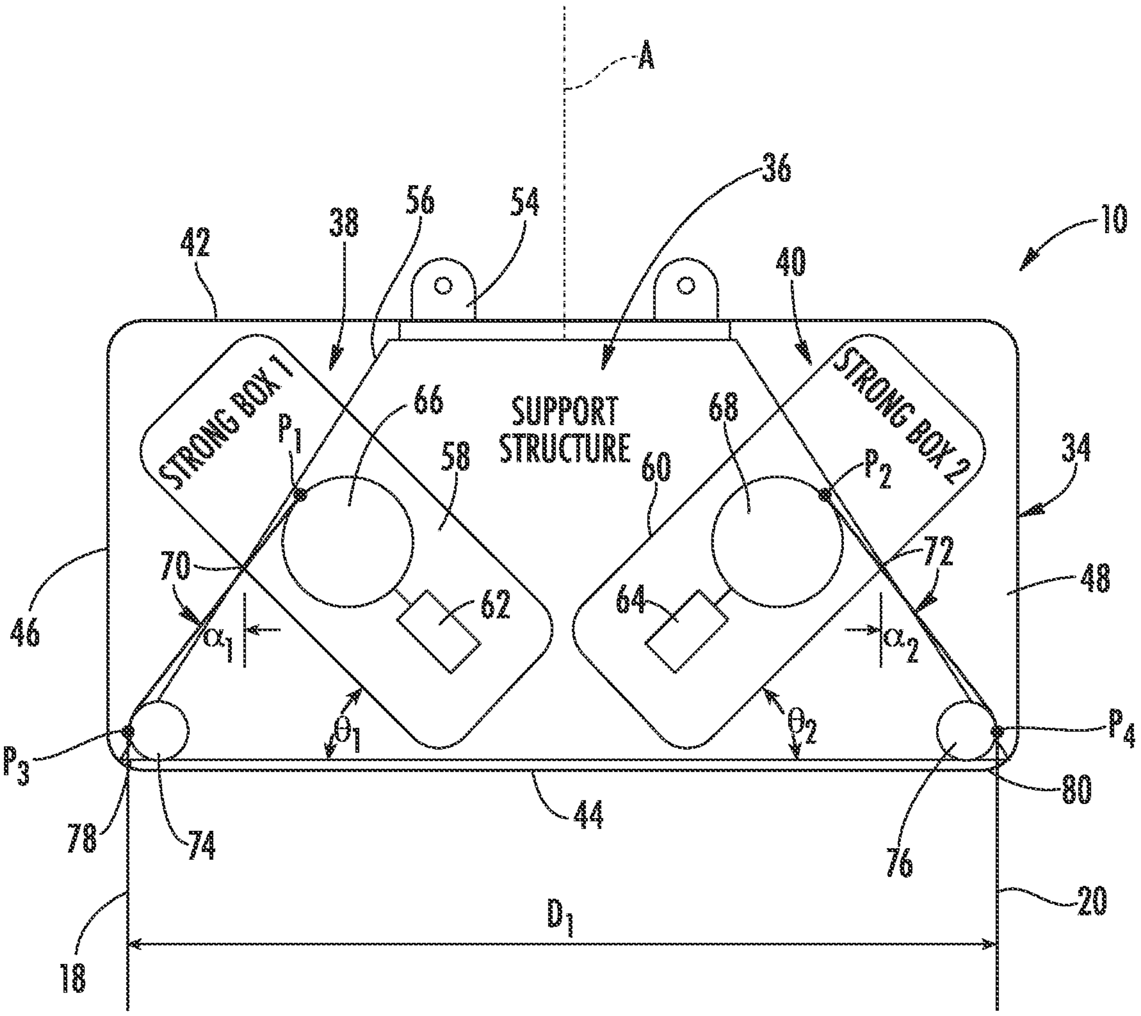
FIG. 2 is a schematic view of the overhead person lifting apparatus of FIG. 1, according to one or more embodiments shown and described herein.

Referring to FIG. 2, the person lifting apparatus 10 includes a housing 34 and a support structure 36 that is located in the housing 34 and supports a pair of lifting strap feeding devices 38 and 40 within the same housing 34. The lifting strap feeding devices 38 and 40 each wind up and pay out their respective lifting strap 18 and 20. The housing 34 includes a top 42, a bottom 44, sides 46, 48, a front 50 and a back 52 (FIG. 1) defining an enclosure that houses the lifting strap feeding devices 38 and 40. A hanging bracket 54 is located at the top 42 of the housing 34 and may be connected to the housing 34 and support structure 36. The hanging bracket 54 may also be part of or connected to the carriage 16 (FIG. 1) and allow for rotation of the housing 34 about a vertically oriented axis of rotation A. Rotation of the housing 34 using the carriage 16 may be effectuated manually and/or may be motorized. Manual rotation of the housing 34 may be caused, for example, by manually grasping one of the lifting straps 18 and 20 and/or the sling bar devices 30, 32 and applying a rotational force to the housing 34 by pulling the lifting straps 18 and 20 and/or the sling bar devices 30, 32. A brake or other stop mechanism may be used to inhibit rotation of the housing 34 when desired.

As can be seen in FIG. 2, the support structure 36 includes support components (represented by element 56, such as beams, brackets, fasteners, etc.) that support the lifting strap feeding devices 38 and 40. The strap feeding devices 38 and 40 generally include housings 58 and 60, motors 62 and 64, and drums 66 and 68 that are rotated by the motors 62 and 64 to wind up and pay out the lifting straps 18 and 20. The drums 66 and 68 may be coupled to a shaft of the motors 62 and 64 and may be configured to extend and retract the lifting straps 18 and 20 as the motors 62 and 64 rotate the drums 66 and 68 in response to a user providing an input to a control system via an input device. The strap feeding devices 38 and 40 are supported by the support structure 36 at angles $\theta_1$ and $\theta_2$ to horizontal. The support structure 36 supports the lifting strap feeding devices 38 and 40 at the angles $\theta_1$ and $\theta_2$ to horizontal such that lifting strap feed out locations 70 and 72 are not facing vertically or horizontally only, but also face outward at an angle to both vertical and horizontal. Such a non-horizontal and non-vertical arrangement for the lifting strap feeding devices 38 and 40 can allow the lifting strap feeding devices 38 and 40 to pay out the lifting straps 18 and 20 at angles $\alpha_1$ and $\alpha_2$ to vertical inside the housing 34 toward the sides 46 and 48 of the housing 34.

The lifting straps 18 and 20 may release from the drums 66 and 68 at points $P_1$ and $P_2$ where the lifting straps 18 and 20 are substantially tangent to their respective drum 66, 68. The lifting straps 18 and 20 are then directed over spacing rollers 74 and 76 that are spaced horizontally from the points $P_1$ and $P_2$ and offset horizontally from the drums 66 and 68 thereby increasing a horizontal spacing between the lifting straps 18 and 20 as they release from their drums 66 and 68 at points $P_1$ and $P_1$ to points $P_3$ and $P_4$ where they release from their spacing rollers 74 and 76. By the spacing rollers being "offset horizontally" from the drums, it is meant that a centerline of the spacing rollers is offset horizontally from a centerline of the drums. The points $P_3$ and $P_4$ may be spaced apart horizontally a predetermined distance $D_1$, such as between about 10 inches and about 30 inches. The predetermined distance $D_1$ depends on a number of factors including a maximum required distance $D_m$ between the free ends 26 and 28 of the lifting straps 18 and 20 under operating conditions, as will be described in greater detail below. FIG. 2 illustrates the lifting straps 18 and 20 in a freely hanging configuration with the lifting straps 18 and 20 not in use for a lifting operation. In the freely hanging configuration, the lifting straps 18 and 20 hang from the spacing rollers 74 in a vertical orientation from the spacing rollers 74 and 76. The lifting straps 18 and 20 may extend downward from the spacing rollers 74 and 76 and exit the housing 34 at exit openings 78 and 80. While spacing rollers 74 and 76 are described, various other spacing members may be used that may or may not move or rotate.

Figure 3A:
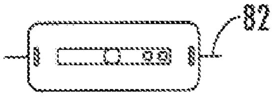
FIG. 3A is a bottom view of the overhead person lifting apparatus of FIG. 3.
Figure 3:
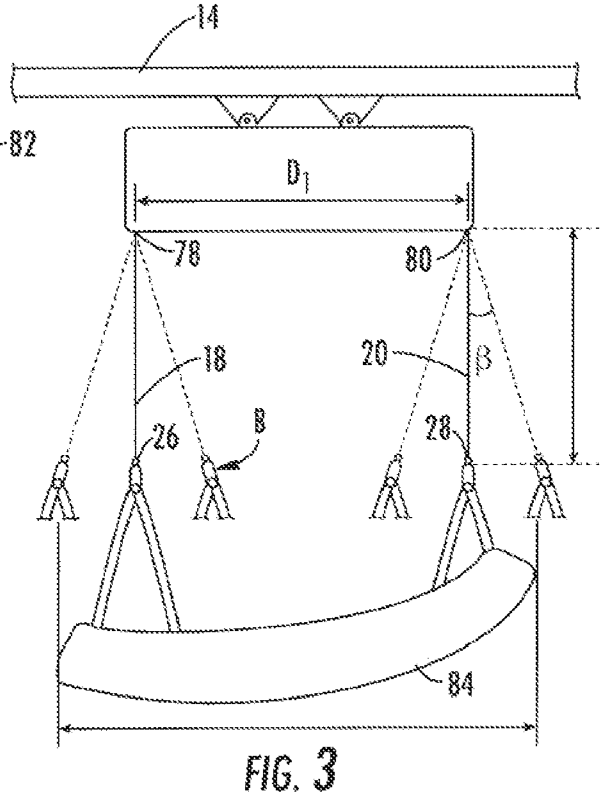
FIG. 3 is a diagrammatic front view of the overhead person lifting apparatus of FIG. 1, according to one or more embodiments shown and described herein.
Figure 3B:
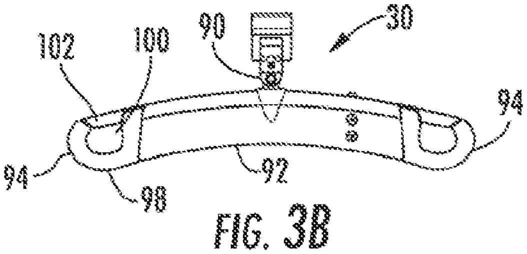
FIG. 3B is a side view of a sling bar device for use with the overhead person lifting apparatus of FIG. 3.

Referring to FIG. 3, the person lifting apparatus 10 is illustrated with its long axis 82 (see FIG. 3A) parallel with a direction of travel along the rail 14. A sling 84 is illustrated connected to the sling bar devices 30 and 32. As shown in FIG. 3B, the sling bar devices 30, 32 (only sling bar device 30 is shown) includes a connector 90 for coupling the sling bar device 30 to the person lifting apparatus 10. The connector 90 is fixedly coupled to the sling bar device 30 in FIG. 3B, although in other embodiments, the connector 90 may be movably coupled to the sling bar device 30. Allowing the connector 90 to move with respect to the sling bar device 30 may help to decrease the torque forces on the connector 90 when the sling 84 is coupled to the sling bar device 30, maintain the alignment of the sling 84, sling bar device 30, and person lifting apparatus 10, and prevent twisting of various components.

The sling bar device 30 includes an elongated bar 92 and two hooks 94 coupled to the distal ends of the elongated bar 92. In other embodiments, the sling bar device 30 may be an X-shaped sling bar that includes two curved frame members coupled by a middle frame member and including four support apparatus coupling mechanisms. In still other embodiments, the sling bar may include a U-shaped frame including two support apparatus coupling mechanisms and a U-shaped handle extending from the frame to provide stability to a subject being lifted. Other sling bar configurations are contemplated. Various sling bar configurations are described in greater detail in U.S. Pat. No. 9,757,297, entitled "Person Lift System."

The hooks 94 include a coupling base 98 with a recessed space 100 therein and a latch 102 configured to selectively enclose the recessed space 100. The latch 102 is pivotally coupled to the coupling base 98 and is configured to extend across the recessed space 100 in a closed position and rotate towards the recessed space 100 in an open position. In operation, when a user couples the sling 84 to the hook 94, the user lifts the latch 102 (i.e., rotates the latch 102 away from the recessed space 100), to allow the strap(s) or other portion of the sling 84 to be inserted into the recessed space 100. When a user removes the sling 84 from the hook 94, the user lifts the latch 102 to rotate the latch 102 toward an open position (i.e., rotates the latch 102 away from the recessed space 100) such as with a sling strap to allow the sling 84 to be removed from the recessed space 100.

Suitable sling bars include, by way of example and not limitation, those commercially available under the trade name SlingGuard from Liko, HILL-ROM®, or Hill-Rom Services, Inc. (Batesville, Indiana). Additionally, it is contemplated that some embodiments may not include a sling bar.

Referring again to FIG. 3, in the vertical orientation as shown by solid lines, the lifting straps 18 and 20 can maintain the predetermined distance $D_1$ at their exit openings 78 and 80 and their free ends 26 and 28. While the predetermined distance $D_1$ may be set using fixed positions of the spacing rollers 74 and 76, other strap parameters may be variable during use or even set, for example, using a controller that can control operation of the strap feeding devices 38 and 40.

During use, the lifting straps 18 and 20 may swing an angle β from vertical, as illustrated by the dashed lines. As examples, the lifting straps 18 and 20 may swing inward toward one another, or outward away from one another depending on the size of the person and/or position of the person (e.g., sitting, laying) in the sling 84. For a maximum angle β one might expect during operation, a horizontal spread distance $D_s$ can be calculated for a predetermined minimum lift gap distance $D_{lg}$. The minimum lift gap distance $D_{lg}$ is the shortest desired operational distance from the exit openings 78 and 80 to the free ends 26 and 28 of the lifting straps 18 and 20 with the lifting straps 18 and 20 in the vertical configuration. The spread distance $D_s$ is given by:

$$D_s=(D_{lg})\text{TAN } \beta.$$

Thus, for a maximum required distance $D_m$ between the free ends 26 and 28 of the lifting straps 18 and 20, the predetermined distance $D_p$ can be determined by:

$$D_p=D_m-2D_s.$$

EXAMPLE

Referring still to FIG. 3, assuming a maximum required distance $D_m$ of about 36 inches in order to accommodate persons of a certain build, a minimum lift gap distance $D_{lg}$ of 24 inches and a maximum angle β of 20°, the calculated spread distance $D_s$ is 8.74 inches. In this example, the predetermined distance $D_p$ to accommodate the maximum required distance $D_m$ at the minimum lift gap distance $D_{lg}$ and max angle β would be about 18.5 inches. The positions of the spacing rollers 74 and 76 can be selected accordingly.

Figure 4:
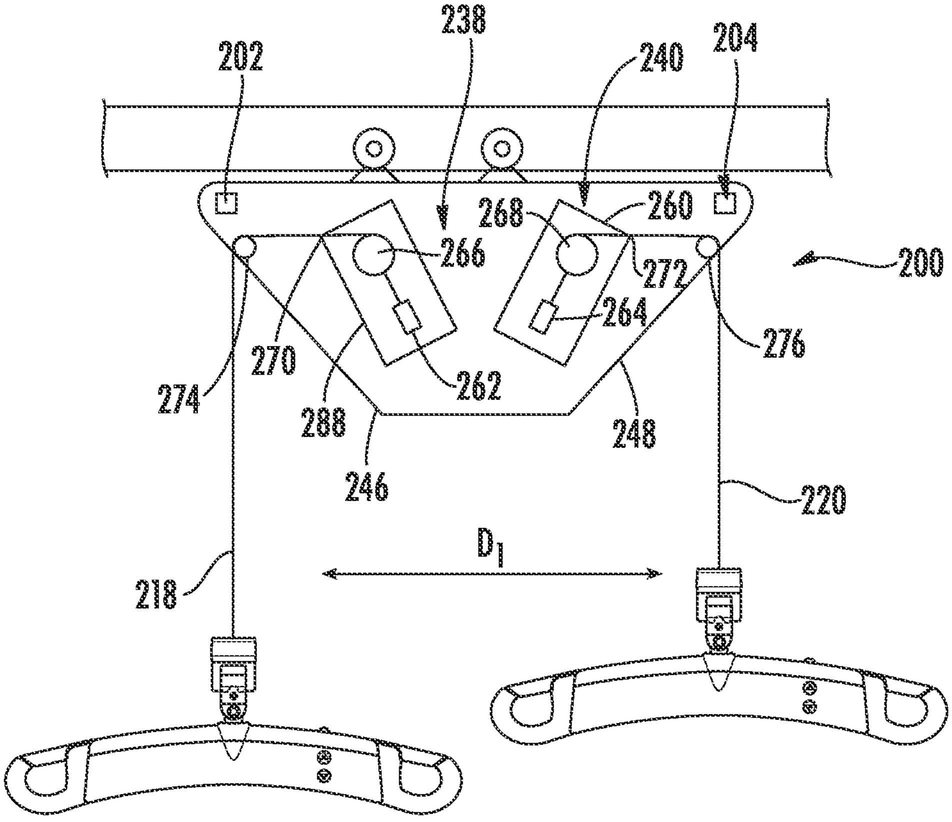
FIG. 4 is a side view of another embodiment of an overhead person lifting device, according to one or more embodiments shown and described herein.

Referring to FIG. 4, another embodiment of a person lifting apparatus 200 includes many of the components described above with respect to person lifting apparatus 10 including a pair of strap feeding devices 238 and 240 with drums 266 and 268 and motors 262 and 264 and housings 258 and 260 that are angled relative to both horizontal and vertical to have strap feed out locations 270 and 272 that face outward both horizontally and vertically toward sides 246 and 248 of the housing 232 of the person lifting apparatus 200. In this embodiment, the sides 246 and 248 may be angled to allow for both horizontal and vertical adjustability of spacing rollers 274 and 276. Actuators 202 and 204, for example, may be provided that can be used to adjust positions of the spacing rollers 274 and 276 along heights of the sides 246 and 248. Moving the spacing rollers 274 and 276 along the sides 246 and 248 also adjusts the horizontal spacing and the predetermined distance $D_1$ between lifting straps 218 and 220 that are trained about the spacing rollers 274 and 276.

Figure 5:
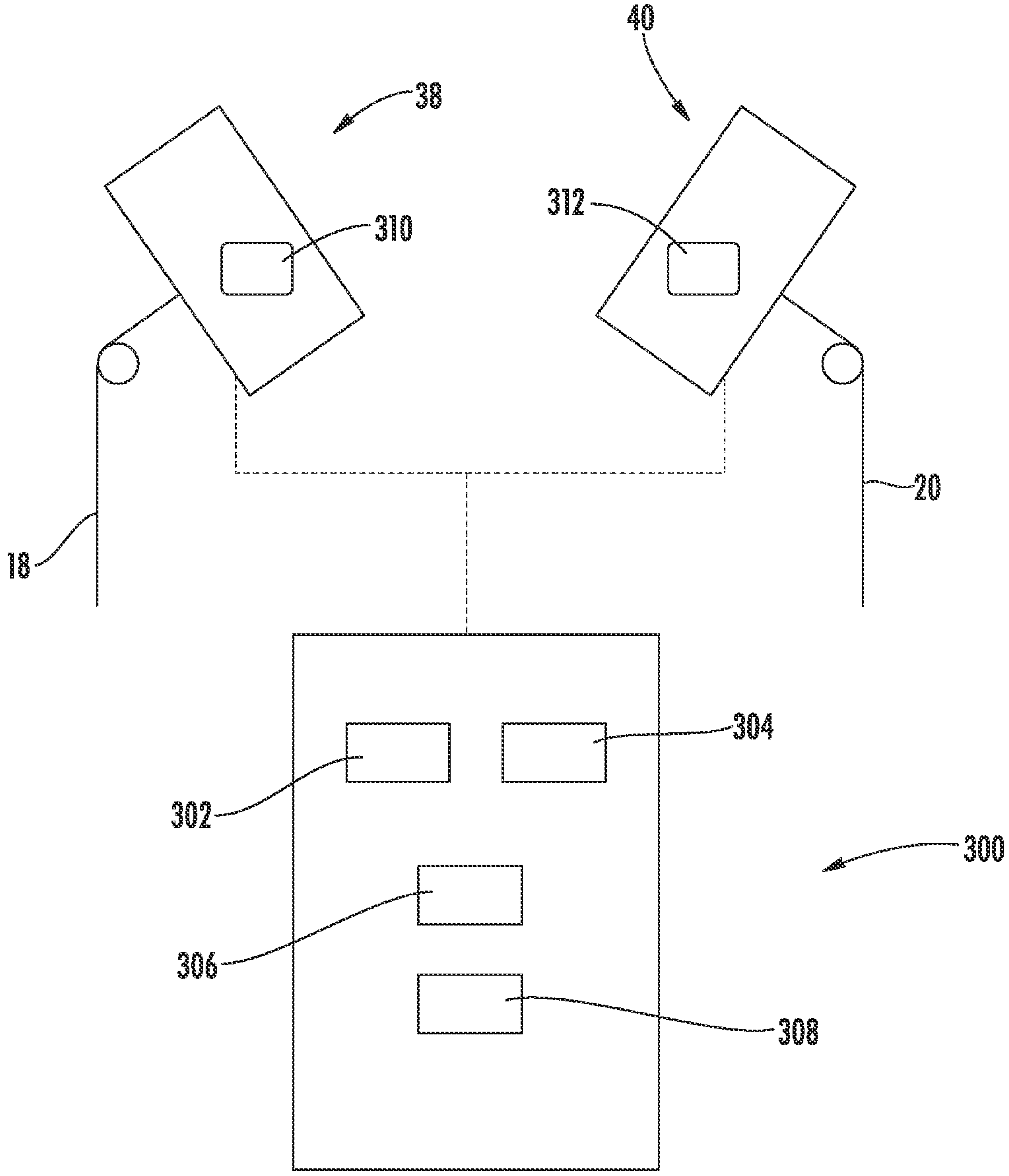
FIG. 5 is a schematic illustration of an user input device for use with the overhead person lifting apparatus of FIG. 1, according to one or more embodiments shown and described herein.
Figure 6:
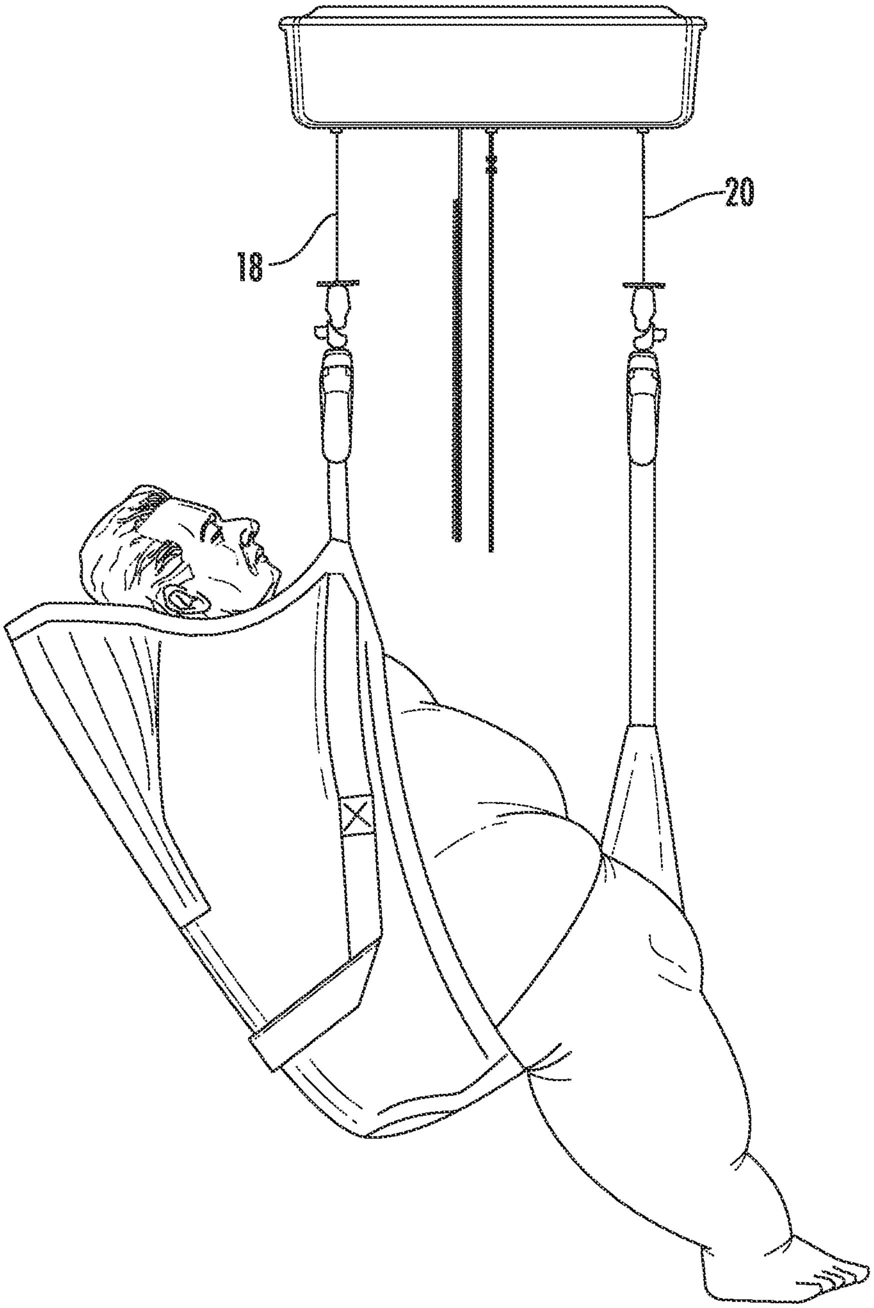
FIG. 6 is a schematic illustration of an overhead person lifting device in use, according to one or more embodiments shown and described herein.
Figure 7:
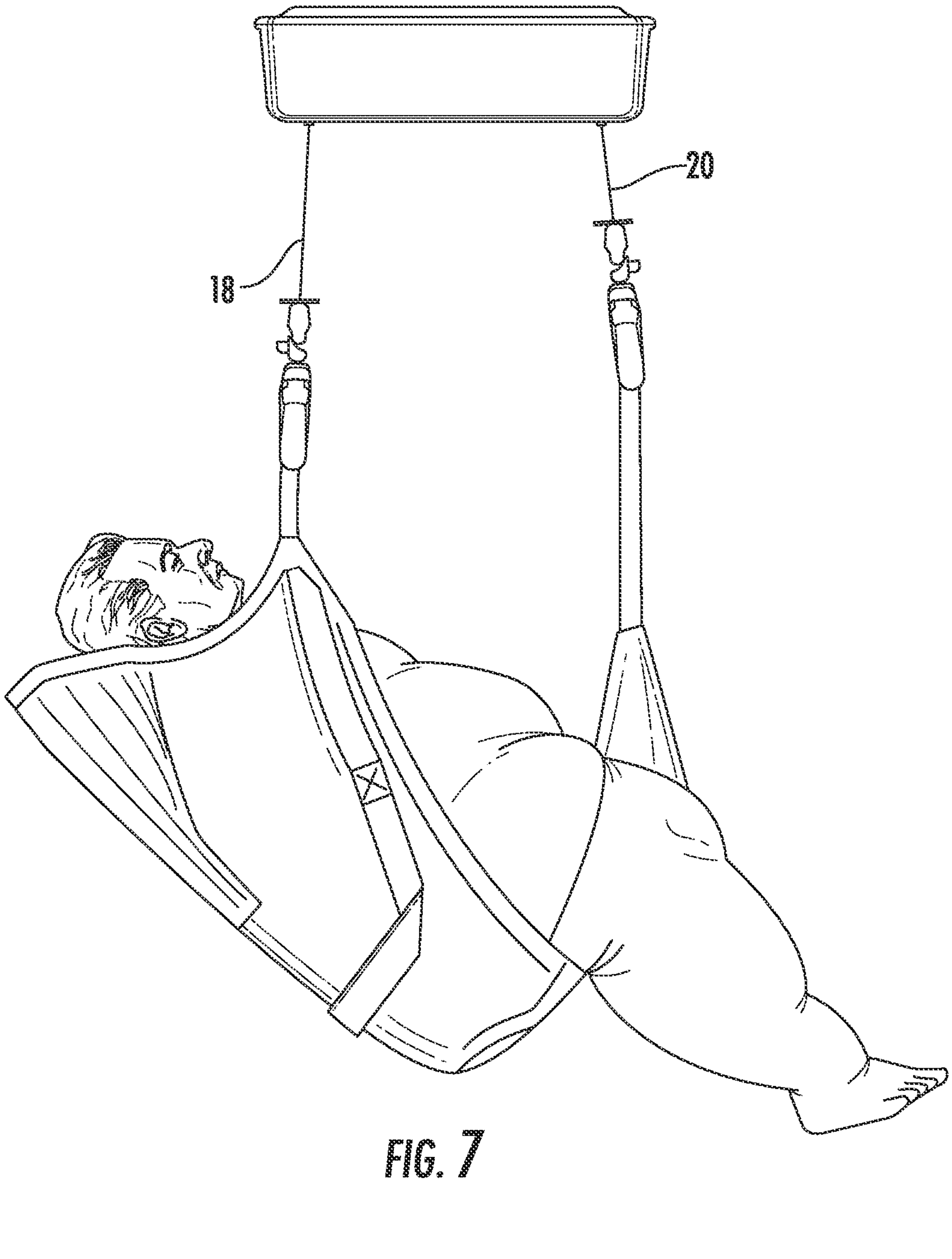
FIG. 7 is another schematic illustration of an overhead person lifting device in use, according to one or more embodiments shown and described herein.

Referring now to FIG. 5, a user input device 300 (e.g., a remote control) is illustrated that allows a user to control operation of the person lifting apparatuses 10, 200 described above. The user input device 300 may be operably connected to the strap feeding devices 38 and 40 that feed the lifting straps 18 and 20, as discussed above. The user input device 300 may include tilt controls 302 and 304. As an example, the tilt control 302 may be a clockwise tilt control that, upon actuation, causes the strap feeding device 38 to wind up the lifting strap 18, while the strap feeding device 40 pays out the lifting strap 20 (see FIG. 6). The tilt control 304 may be a counterclockwise tilt control that, upon actuation, causes the strap feeding device 38 to pay out the lifting strap 18, while the strap feeding device 40 winds up the lifting strap 20 (see FIG. 7). In other embodiments, the tilt controls 302 and 304 may only raise and lower one of the lifting straps 18 and 20 (e.g., to move the head up and down while leaving the legs stationary). In some embodiments, the tilt controls 302 and 304 can be used to rotate a person from a prone position to a sitting position, for example.

The user input device 300 may also include up and down controls 306 and 308 that causes both strap feeding devices 38 and 40 to operate simultaneously to raise and lower the lifting straps 18 and 20 together. While the tilt controls 302, 304 and the up and down controls 306 and 308 are illustrated there may be other controls. For example, there may be individual up and down controls for each of the strap feeding devices 38 and 40. Further, there may be controls for moving the spacing rollers 74 and 76, as described with reference to FIG. 4. The user input device 30 may be wired or wirelessly connected to the strap feeding devices 38 and 40. The user input device 300 may control the strap feeding devices 38 and 40 directly, or controllers 310 and 312 may be provided that receive input signals from the user input device 300.

The user input device 300 may be dedicated to controlling the strap feeding devices 38 and 40, such as a remote. In some embodiments, the user input device 300 may be a personal computing device, such as a smart phone or tablet that includes software that can be used to control operation of the strap feeding devices. Further, the user input device 300 and controllers 310 and 312 may be connected to the internet for remotely controlling operation of the strap feeding devices 38 and 40.

Figure 13:
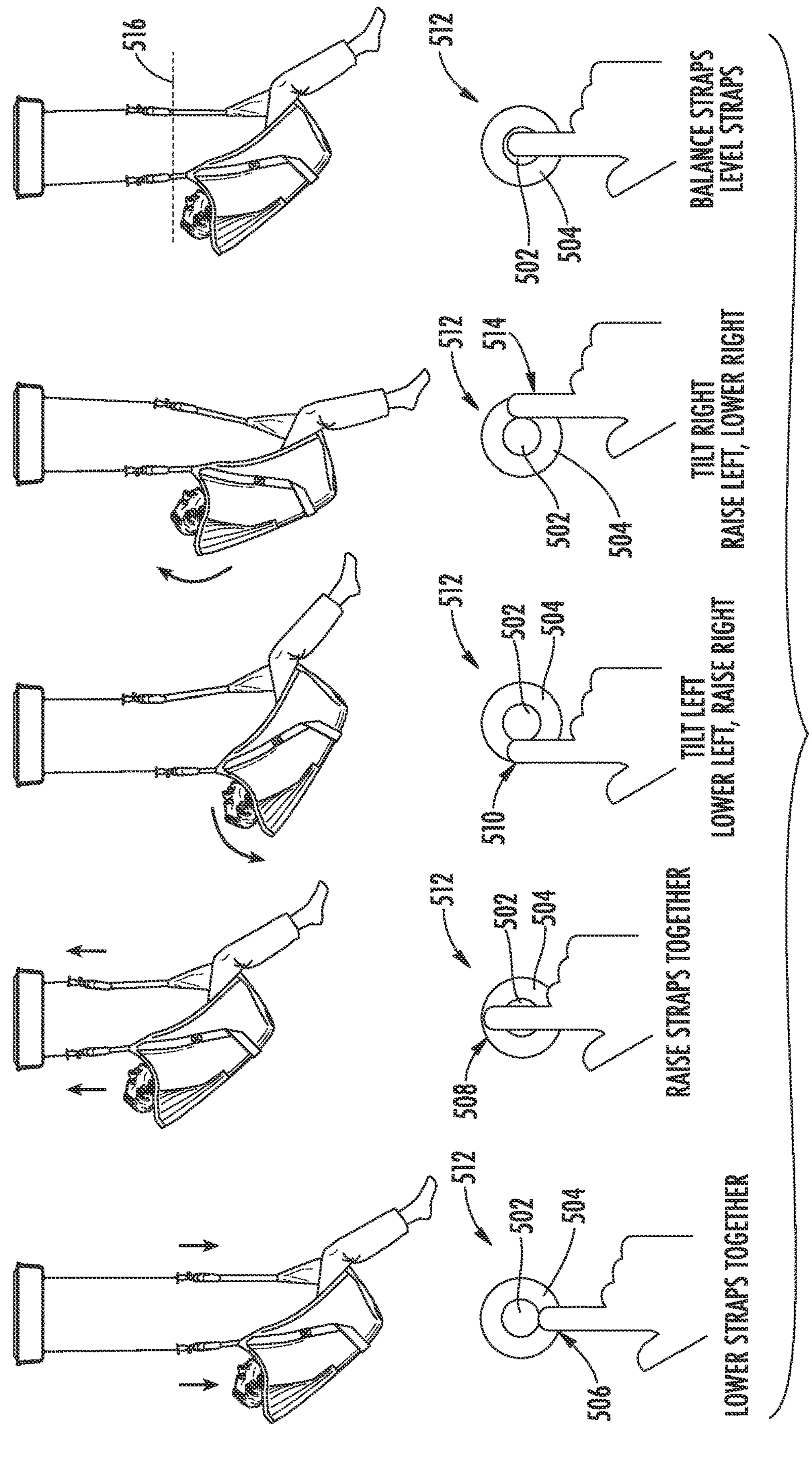
FIG. 13 illustrates a method of controlling an overhead person lifting device using a user input, according to one or more embodiments shown and described herein.

Referring to FIG. 13, a user input device 512 is illustrated that includes a central balance control button 502 and an outer tilt control button 504 that surrounds the balance control button 502. As can be seen, the tilt control button 504 includes control regions 506, 508, 510 and 514 that can be used to lower the straps together, raise the straps together, tilt left and tilt right, respectively. The balance control button 502 can be used to level the straps bringing the straps into horizontal alignment as indicated by dashed line 516.

Figure 8:
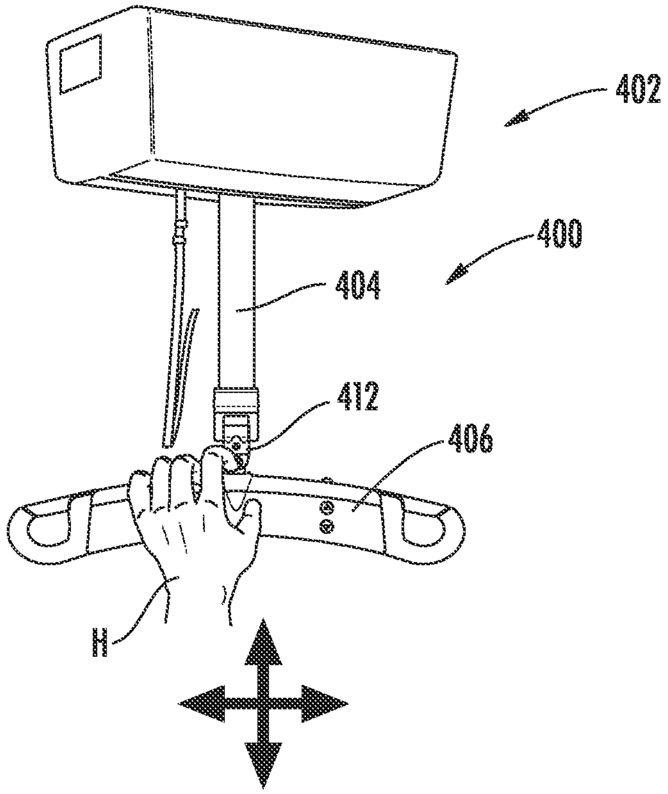
FIG. 8 is a schematic illustration of another overhead person lifting device including a strap movement system, according to one or more embodiments shown and described herein.
Figure 9:
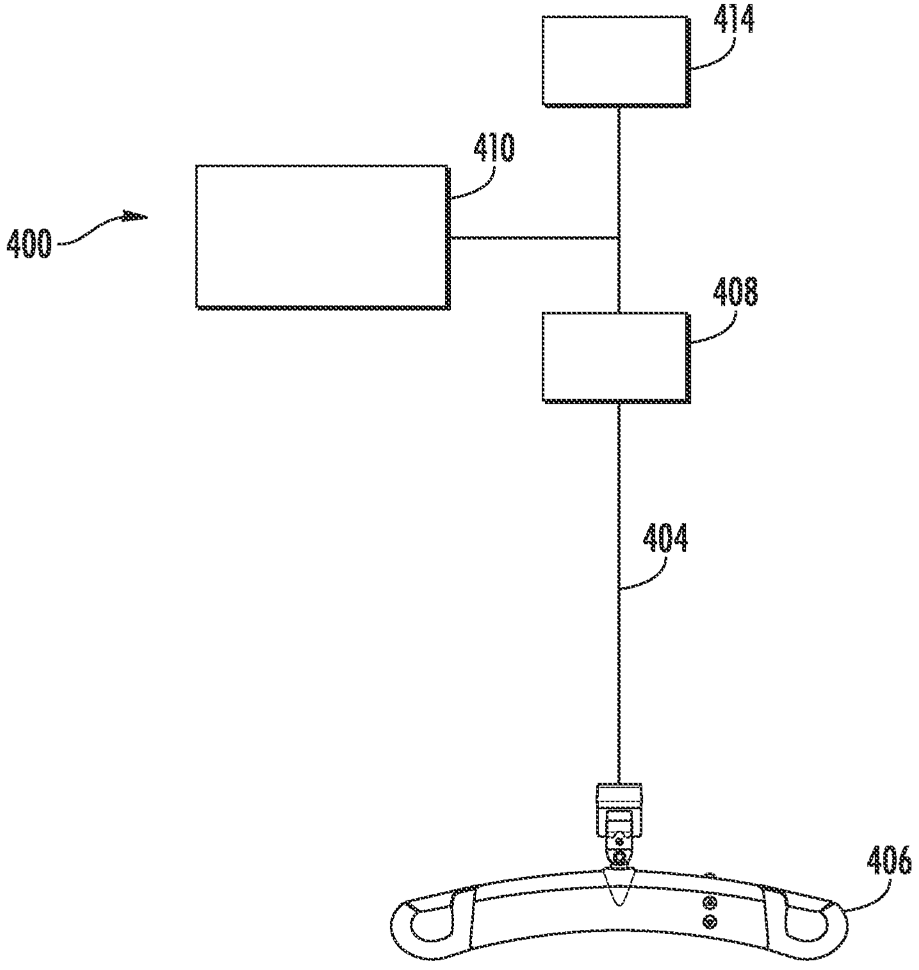
FIG. 9 is a schematic illustration of the strap movement system of FIG. 1, according to one or more embodiments shown and described herein.

Referring to FIGS. 8 and 9, another embodiment of a user input includes a strap movement system 400 for a person lifting apparatus 402 that can be operated manually using manual force applied to the lifting strap 404. As illustrated, an operator may place a hand H on a sling bar device 406 or other device connected to the lifting strap 404. When lowering the lifting strap 404 is desired, the user may apply a downward, unoccupied force on the lifting strap 404 that can be sensed using a sensor 408. As used herein, the term “unoccupied force” refers to a force applied to the lifting strap without the weight of supporting a person that would be expected during a lifting or support operation. The sensor 408 may provide a signal indicative of the load to a controller 410. The sensor 408 may provide a signal indicative of a true force, weight (e.g., a scale) or may provide a signal only if the force/weight is within a predetermined range. If the controller 410 determines that a load is present that is below a threshold value (e.g., less than would be expected during a person lifting or support operation), but above that expected from the sling bar device 406 alone, the controller instructs a strap feeding device 414 to operate in a fast mode, which pays out the lifting strap 404 at a higher rate. If the force detected on the lifting strap 404 is below or above predetermined threshold values, the controller 410 instructs the strap feeding device to stop. In some embodiments, the operator may utilize a user input 412 to operate in the fast mode and look for the additional force applied to the lifting strap 404. The user input 412 may also be used to deactivate the fast mode where the control no longer looks for the additional force applied to the lifting strap 404. The user input 412 can also be used to raise and lower the lifting strap at a normal operating speed outside of the fast mode. Other examples to activate the fast mode include using a sensor to sense physical/skin contact with the sling bar device and/or including a contact that can be actuated by the operator that can provide a signal to the controller 410.

In the fast mode, the controller 410 may also look for an absence or reduced force on the lifting strap 404. For example, if the operator lifts the sling bar device 406, the sensor 408 provides a signal to the controller 410 that is indicative of this reduction in force. The controller 410 may then instruct the strap feeding device 414 to wind up the lifting strap 404 at a higher rate. Once the weight of at least the sling bar alone is detected (e.g., a predetermined threshold value), the controller 410 may stop operation of the strap feeding device 414. The strap movement system 400 allows for one-handed pre-positioning of the sling bar device 406 for engaging a sling, for example. It should be noted that the strap movement system can be used with person lifting devices including only a single strap and with person lifting devices including multiple straps.

Figure 10:
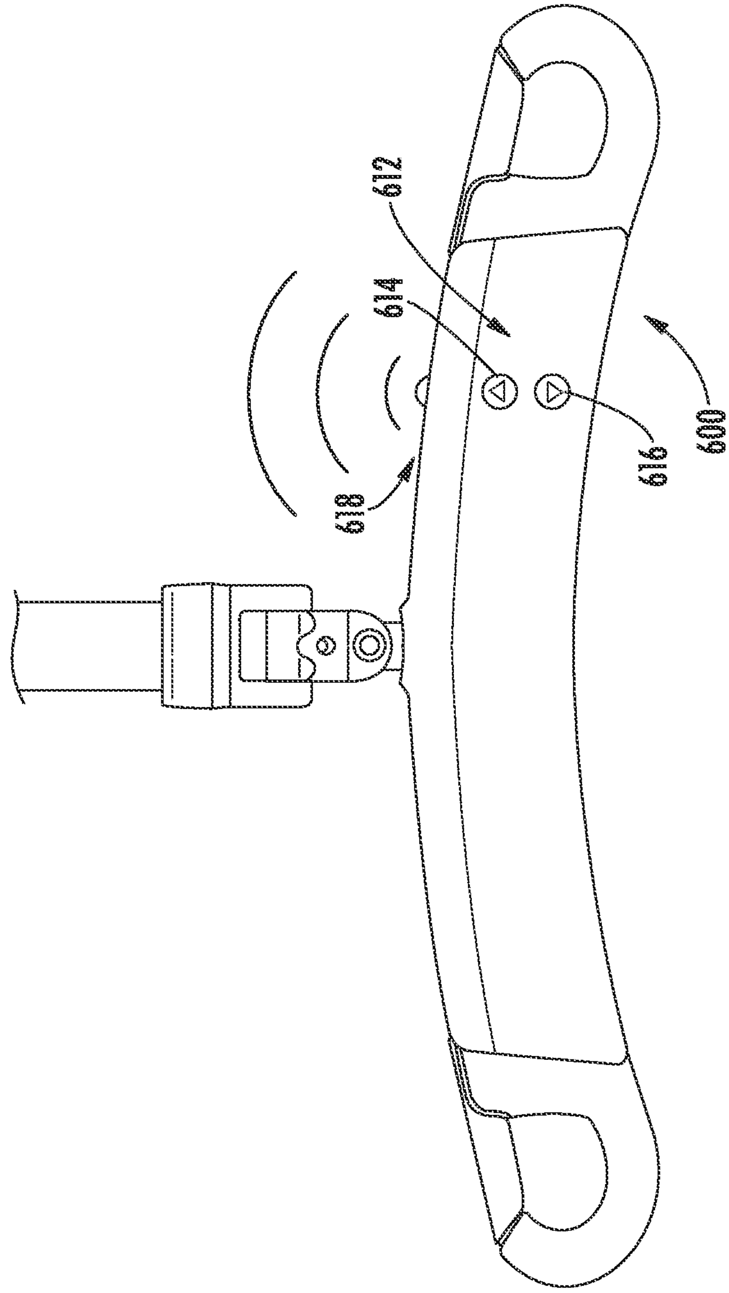
FIG. 10 is a schematic illustration of a sling bar with user input, according to one or more embodiments shown and described herein.
Figure 11:
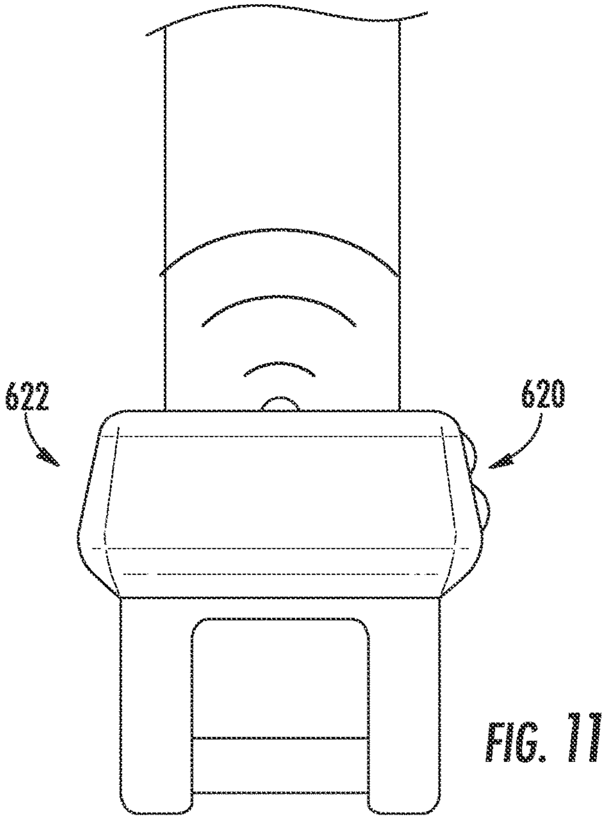
FIG. 11 is a schematic illustration of an accessory coupling with user input, according to one or more embodiments shown and described herein.
Figure 12:
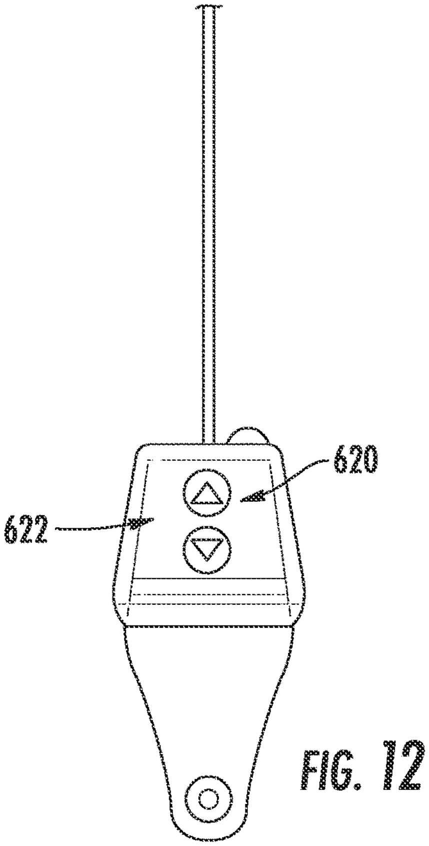
FIG. 12 is a side illustration of the accessory coupling of FIG. 12.

Referring to FIG. 10, a user input 612 is provided directly on a sling bar 600. The user input 612 may include an up or retract button 614 and a down or extend button 616. Actuating the buttons 614 and 616 can place strap movement system 600 in fast mode and also deactivate the fast mode as described above and operate using load detection. An emitter 618 may be provided that can communicate the signals from the user input 612 to the controller 410. The strap movement system 400 may include a receiver 624 that can receive the signals from the emitter 618. For example, the emitter 618 may be an IR emitter. Other communication devices may be used, such as Bluetooth® or other wireless communication. FIGS. 11 and 12 illustrate a user input 620 that is located on coupling 622.

The above-described person lifting systems provides a multiple lifting strap solution for supporting, raising and lowering, and tilting persons. The multiple strap feeding devices along with the associated lifting straps can support various body types, such as bariatric patients that need assistance in raising and lowering their bodies. For example, the strap feeding devices may each be rated up to 550 pounds each for a total of 1100 pounds. However, the strap feeding devices may be rated for more or less than 550 pounds each. Further, the strap feeding devices may be operated together or separately to raise and lower the lifting straps together or separately. Feeding the lifting straps both horizontally and vertically toward sides of the housing of the person lifting apparatus can help maintain a maximum required distance at the ends of the lifting straps, which can aid in comfort during use.

Embodiments can be described with reference to the following numbered clauses, with preferred features laid out in the dependent clauses:

1. A person lifting apparatus comprising a housing; a first lifting strap feeding device located in the housing, the first lifting strap feeding device comprising a first drum and a first lifting strap wound on the first drum; and a second lifting strap feeding device located in the housing, the second lifting strap feeding device comprising a second drum and a second lifting strap wound on the second drum; wherein the first lifting strap feeding device is support by a support structure such that the first lifting strap is directed both horizontally and vertically in the housing toward an exit opening in the housing that is offset horizontally from the first drum.
2. The person lifting apparatus of the preceding clause, wherein the exit opening is a first exit opening, the second lifting strap feeding device is supported by a support structure such that the second lifting strap is directed both horizontally and vertically in the housing toward a second exit opening that is offset horizontally from the second drum.

3. The person lifting apparatus of clause 1 or 2 further comprising a spacing member about which the first lifting strap extends, the spacing member being offset horizontally from the first drum.

4. The person lifting apparatus of the preceding clause, wherein the spacing member is a first spacing member, the person lifting apparatus further comprising a second spacing member about which the second lifting strap extends, the second spacing member being offset horizontally from the second drum.

5. The person lifting apparatus of the preceding clause, wherein a horizontal spacing between the first lifting strap and the second lifting strap as they release from the first spacing member and second spacing member, respectively, is between about 10 inches and 30 inches.

6. The person lifting apparatus of any one of clauses 1-5, wherein a strap feed out location of the second lifting strap feeding device faces outward at an angle to both horizontal and vertical.

7. The person lifting apparatus of any one of clauses 1-6, wherein a strap feed out location of the first lifting strap feeding device faces outward at an angle to both horizontal and vertical.

8. The person lifting apparatus of any one of clauses 1-7 further comprising a user input device that controls operation of both the first lifting strap feeding device and the second lifting strap feeding device.

9. The person lifting apparatus of the preceding clause, wherein the user input device comprises a tilt control that operates the first lifting strap feeding device differently than the second lifting strap feeding device.

10. A person lifting apparatus comprising: a housing; a first lifting strap feeding device located in the housing, the first lifting strap feeding device comprising a first drum and a first lifting strap wound on the first drum; and a second lifting strap feeding device located in the housing, the second lifting strap feeding device comprising a second drum and a second lifting strap wound on the second drum; wherein the first lifting strap feeding device is support by a support structure such that a strap feed out location of the first lifting strap feeding device faces outward at an angle to both horizontal and vertical.

11. The person lifting apparatus of the preceding clause, wherein the second lifting strap feeding device is supported by a support structure such that a strap feed out location of the second feeding device faces outward at an angle to both horizontal and vertical.

12. The person lifting apparatus of clause 10 or 11, wherein the first lifting strap is directed both horizontally and vertically in the housing toward a first exit opening in the housing that is offset horizontally from the first drum and the second lifting strap is directed horizontally and vertically in the housing toward a second exit opening in the housing that is offset horizontally from the second drum.

13. The person lifting apparatus of any one of clauses 10-12 further comprising a spacing member about which the first lifting strap extends, the spacing member being offset horizontally from the first drum.

14. The person lifting apparatus of the preceding clause, wherein the spacing member is a first spacing member, the person lifting apparatus further comprising a second spacing member about which the second lifting strap extends, the second spacing member being offset horizontally from the second drum.

15. The person lifting apparatus of the preceding clause, wherein a horizontal spacing between the first lifting strap and the second lifting strap as they release from the first spacing member and second spacing member, respectively, is between about 10 inches and 30 inches.

16. The person lifting apparatus of any one of clauses 10-15 further comprising a user input device that controls operation of both the first lifting strap feeding device and the second lifting strap feeding device.

17. The person lifting apparatus of the preceding clause, wherein the user input device comprises a tilt control that operates the first lifting strap feeding device differently than the second lifting strap feeding device.

18. A method of operating a person lifting apparatus, the method comprising: supporting a first lifting strap feeding device in a housing, the first strap feeding device comprising a first drum and a first lifting strap wound on the first drum; supporting a second lifting strap feeding device in the housing, the second strap feeding device comprising a second drum and a second lifting strap wound on the second drum; and directing the first lifting strap both horizontally and vertically in the housing toward an exit opening in the housing that is offset horizontally from the first drum.

19. The method of the preceding clause, wherein the exit opening is a first exit opening, the method further comprising directing the second lifting strap both horizontally and vertically in the housing toward a second exit opening that is offset horizontally from the second drum.

20. The method of clause 18 or 19 further comprising a spacing member about which the first lifting strap extends, the spacing member being offset horizontally from the first drum.

21. The method of the preceding clause, wherein the spacing member is a first spacing member, the person lifting apparatus further comprising a second spacing member about which the second lifting strap extends, the second spacing member being offset horizontally from the second drum.

22. The method of the preceding clause, wherein a horizontal spacing between the first lifting strap and the second lifting strap as they release from the first spacing member and second spacing member, respectively, is between about 10 inches and 30 inches.

23. The method of any one of clauses 18-22, wherein a strap feed out location of the second lifting strap feeding device faces outward at an angle to both horizontal and vertical.

24. The method of any one of clauses 18-23, wherein a strap feed out location of the first lifting strap feeding device faces outward at an angle to both horizontal and vertical.

25. The method of any one of clauses 18-24 further comprising controlling operation of both the first lifting strap feeding device and the second lifting strap feeding device using a user input device.

26. The method of the preceding clause, wherein the user input device comprises a tilt control that operates the first lifting strap feeding device differently than the second lifting strap feeding device.

27. A person lifting apparatus comprising a strap movement system, the person lifting device comprising: a housing; a lifting strap feeding device located in the housing, the lifting strap feeding device comprising a motor connected to a drum and a lifting strap wound on the drum; a sensor that provides a signal indicative of force on the lifting strap; and a controller that receives the signal from the sensor, the controller controlling operation of the motor based on the signal; wherein the controller includes logic that speeds up operation of the motor if the force on the lifting strap is below a predetermined threshold value.

28. The person lifting apparatus of the preceding clause, wherein the controller includes logic that speeds up operation of the motor if the force on the lifting strap is below a second predetermined threshold.

29. The person lifting apparatus of clause 27 or 28 further comprising a sling bar device connected to the lifting strap.

30. The person lifting apparatus of clause 29, wherein the user input is on the sling bar device.

31. The person lifting apparatus of any one of clauses 27-30, wherein the user input is on an accessory coupling connected to the lifting strap.

32. The person lifting apparatus of any one of clauses 27-29 further comprising a user input that places the strap movement system in a fast mode during which the controller speeds up operation of the motor if the force on the lifting strap is above a first predetermined threshold value and below a second predetermined threshold value.

33. A person lifting apparatus comprising a strap movement system, the person lifting device comprising: a housing; a lifting strap feeding device located in the housing, the lifting strap feeding device comprising a motor connected to a drum and a lifting strap wound on the drum; a sensor that provides a signal indicative of force on the lifting strap; a controller that receives the signal from the sensor, the controller controlling operation of the motor based on the signal; and a user input that places the strap movement system in a fast mode during which the controller speeds up operation of the motor.

34. The person lifting apparatus of clause 33, wherein the controller includes logic that speeds up operation of the motor if the force on the lifting strap is below a predetermined threshold value.

35. The person lifting apparatus of clause 33 or 34, wherein the controller includes logic that detects presence of a hand on a sling bar device connected to the lifting strap.

36. A method of operating a strap movement system of a person lifting apparatus, the method comprising: providing a signal from a sensor to a controller that is indicative of force on a lifting strap that is connected to a drum that is connected to a motor; and placing the strap movement system in a fast mode using a user input during which the controller speeds up operation of the motor.

The method of clause 36, wherein the controller speeding up operation of the motor if the force on the lifting strap is below a predetermined threshold value.

The method of clause 35 or 36 wherein the controller includes logic that detects presence of a hand on a sling bar device connected to the lifting strap.

Based on the foregoing, it should be understood that the person lifting apparatuses described herein provide multiple lifting straps that are directed away from one another with the housings to provide a predetermined distance between the straps as they exit the housing. The lifting straps may be operated together or individually using respective strap feeding devices.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A person lifting apparatus comprising:

an outer housing a first lifting strap feeding device in the outer housing, the first lifting strap feeding device comprising a first drum and a first lifting strap wound on the first drum and having a first drum release location;

a second lifting strap feeding device in the outer housing, the second lifting strap feeding device comprising a second drum and a second lifting strap wound on the second drum and having a second drum release location;

a first spacing roller offset horizontally from the first drum, the first lifting strap directed over the first spacing roller providing a first roller release location offset horizontally from the first drum release location; and a second spacing roller offset horizontally from the second drum, the second lifting strap directed over the second spacing roller providing a second roller release location offset horizontally from the second drum release location.

2. The person lifting apparatus of claim 1, wherein the first lifting strap device comprises:

a first motor operatively connected to the first drum that rotates the first drum;

a second motor operatively connected to the second drum that rotates the second drum; and a controller that independently controls operation of the first motor and the second motor to raise and lower the first lifting strap and the second lifting strap relative to one another.

3. The person lifting apparatus of claim 2, wherein the controller adjusts a distance between the first roller release location and the second roller release location using actuators.

4. The person lifting apparatus of claim 1, wherein a feed direction of the first lifting strap from the first lifting strap feeding device is oblique to horizontal and vertical directions.

5. The person lifting apparatus of claim 4, wherein a feed direction of the second lifting strap from the second lifting strap feeding device is oblique to horizontal and vertical directions.

6. The person lifting apparatus of claim 1 further comprising a user input device comprising a first tilt control that causes the first lifting strap feeding device to pay out the first lifting strap and the second lifting strap feeding device to wind up the second lifting strap and a second tilt control that causes the first lifting strap feeding device to wind up the first lifting strap and the second lifting strap feeding device to pay out the second lifting strap.

7. The person lifting apparatus of claim 1, wherein the first lifting strap feeding device comprises a first inner housing located in the outer housing and the second lifting strap feeding device comprises a second inner housing located in the outer housing.

8. A method of controlling a person lifting apparatus, the method comprising:

instructing a first lifting strap feeding device located in a housing to pay out a first lifting strap, the first lifting strap being wound on a first drum having a first drum release location and directed over a first spacing roller that is offset horizontally from the first drum; and instructing a second lifting strap feeding device located in the housing to wind up a second lifting strap, the second lifting strap being wound on a second drum having a second drum release location and directed over a second spacing roller that is offset horizontally from the second drum.

9. The method of claim 8, wherein paying out the first lifting strap comprises rotating the first drum using a first motor and winding up the second lifting strap comprises rotating the second drum using a second motor.

10. The method of claim 8 further comprising a controller adjusting a distance between a first roller release location and a second roller release location using actuators.

11. The method of claim 8, wherein a feed direction of the first lifting strap from the first lifting strap feeding device is oblique to horizontal and vertical directions.

12. The method of claim 11, wherein a feed direction of the second lifting strap from the second lifting strap feeding device is oblique to horizontal and vertical directions.

13. The method of claim 8 further comprising a user input device comprising a first tilt control causing the first lifting strap feeding device to pay out the first lifting strap and the second lifting strap feeding device to wind up the second lifting strap and a second tilt control causing the first lifting strap feeding device to wind up the first lifting strap and the second lifting strap feeding device to pay out the second lifting strap.

14. A person lifting apparatus comprising a strap movement system, the person lifting device comprising:

a housing;

a lifting strap feeding device located in the housing, the lifting strap feeding device comprising a motor connected to a drum and a lifting strap wound on the drum;

a sensor configured to provide a signal indicative of force on the lifting strap;

a controller configured to receive the signal from the sensor, the controller controlling operation of the motor based on the signal; and wherein the controller includes logic that, based on the signal from the sensor, is configured to speed up operation of the motor if an unoccupied force on the lifting strap is above a predetermined threshold value.

15. The person lifting apparatus of claim 14, wherein the controller includes logic that, based on the signal, places the strap movement system in a fast mode.

16. The person lifting apparatus of claim 14, wherein the controller includes logic that detects presence of a hand on a sling bar device connected to the lifting strap.

17. The person lifting apparatus of claim 16 further comprising a user input device configured to put the strap movement system in a fast mode during which the controller looks at the signal from the sensor.

18. The person lifting apparatus of claim 17, wherein the user input device is on an accessory coupling connected to the lifting strap or on the sling bar device.

19. The person lifting apparatus of claim 17, wherein the user input device comprises an up button that, when actuated, instructs the controller to retract the lifting strap using the motor and a down button that, when actuated, instructs the controller to pay out the lifting strap using the motor.

20. The person lifting apparatus of claim 17, wherein the user input device is used to deactivate the fast mode where the controller no longer looks at the signal from the sensor to speed up operation of the motor.

* * * * *